United States Patent
Hunt-Schroeder et al.

(10) Patent No.: US 11,962,709 B1
(45) Date of Patent: Apr. 16, 2024

(54) STRUCTURES AND METHODS FOR DERIVING STABLE PHYSICAL UNCLONABLE FUNCTIONS FROM SEMICONDUCTOR DEVICES

(71) Applicant: Marvell Asia Pte, Ltd., Singapore (SG)

(72) Inventors: Eric D. Hunt-Schroeder, Essex Junction, VT (US); Darren Anand, Williston, VT (US); Dale Pontius, Colchester, VT (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/305,825

(22) Filed: Jul. 15, 2021

Related U.S. Application Data (60) Provisional application No. 63/052,331, filed on Jul. 15, 2020.

(51) Int. Cl.
*H04L 9/32* (2006.01)
*G06F 21/44* (2013.01)

(52) U.S. Cl.
CPC ............ *H04L 9/3278* (2013.01); *G06F 21/44* (2013.01); *H04L 2209/12* (2013.01)

(58) Field of Classification Search
CPC . H04L 9/3278; H04L 9/0866; H04L 2209/04; H04L 2209/12
See application file for complete search history.

(56) References Cited

U.S. PATENT DOCUMENTS

| | | | |
|---|---|---|---|
| 5,515,540 A | 5/1996 | Grider et al. | |
| 5,736,777 A | 4/1998 | Shield et al. | |
| 6,588,672 B1 | 7/2003 | Usami | |
| 2012/0179952 A1* | 7/2012 | Tuyls | H04L 9/0866 711/E12.078 |
| 2015/0092777 A1* | 4/2015 | Watanabe | H04L 63/061 327/564 |
| 2017/0142082 A1* | 5/2017 | Qian | G06F 21/62 |
| 2017/0142090 A1* | 5/2017 | Mahaffey | H04L 63/0869 |
| 2017/0201382 A1* | 7/2017 | Lindteigen | H04L 63/0823 |

(Continued)

FOREIGN PATENT DOCUMENTS

| | | |
|---|---|---|
| CN | 205281504 U | 6/2016 |
| JP | 2017163030 | 9/2017 |

OTHER PUBLICATIONS

Herder et al., Physical Unclonable Functions and Applications: A Tutorial, Aug. 2014, IEEE, vol. 102, pp. 1126-1141 (Year: 2014).*

*Primary Examiner* — Ellen Tran (57) ABSTRACT

A semiconductor device includes circuitry configured to derive a physical unclonable function. The circuitry includes a plurality of bitcells, each bitcell being readable as one of a '0' value and a '1' value, and sense amplifier circuitry configurable to read values from the plurality of bitcells. The sense amplifier circuitry includes margin circuitry configurable (i) to selectably bias reading of the plurality of bitcells toward one of '0' values and '1' values, (ii) to identify addresses of bitcells having a stable '1' value when the margin circuitry is configured to bias reading of the plurality of bitcells toward '0' values, and (iii) to identify addresses of bitcells having a stable '0' value when the margin circuitry is configured to bias reading of the plurality of bitcells toward '1' values. Each bitcell in the plurality of bitcells may include a differential transistor pair.

16 Claims, 7 Drawing Sheets

(56) References Cited

U.S. PATENT DOCUMENTS

| | | | |
|---|---|---|---|
| 2018/0013562 A1* | 1/2018 | Haider | H04L 63/06 |
| 2018/0075262 A1* | 3/2018 | Auh | H04L 9/0637 |
| 2018/0137293 A1* | 5/2018 | Lucas | G06F 21/602 |
| 2018/0159685 A1* | 6/2018 | Kwak | H04L 9/0866 |
| 2018/0278418 A1* | 9/2018 | Chang | H04L 9/0891 |
| 2019/0140851 A1* | 5/2019 | Ma | G06F 21/72 |
| 2019/0221254 A1* | 7/2019 | Liu | H04L 9/3278 |
| 2020/0136839 A1* | 4/2020 | Tsai | G11C 29/50 |
| 2020/0350264 A1 | 11/2020 | Park | |
| 2022/0191223 A1 | 6/2022 | Zifroni et al. | |

* cited by examiner

STRUCTURES AND METHODS FOR DERIVING STABLE PHYSICAL UNCLONABLE FUNCTIONS FROM SEMICONDUCTOR DEVICES

CROSS REFERENCE TO RELATED APPLICATIONS

This disclosure claims the benefit of, commonly-assigned U.S. Provisional Patent Application No. 63/052,331, filed Jul. 15, 2020, which is hereby incorporated by reference herein in its entirety.

FIELD OF USE

This disclosure relates to the derivation of stable physical unclonable functions from semiconductor devices. More particularly, this disclosure relates to an arrangement of semiconductor devices that can serve as an entropy source for a physical unclonable function, and to circuitry for extracting that physical unclonable function from the entropy source.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many semiconductor devices use cryptographically secure keys for device security. In accordance with accepted industry and government standards, such as those promulgated in the United States by the National Institute of Standards and Technology (NIST), such a key (sometimes referred to as a "unique device secret" or "UDS") should be random (i.e., impossible or nearly impossible to predict, also referred to as "unclonable"), unique (i.e., different on every device), and stable (i.e., should never change on any one device notwithstanding changes in process conditions, voltage, temperature, age, etc.).

SUMMARY

According to implementations of the subject matter of this disclosure, a semiconductor device includes circuitry configured to derive a physical unclonable function. The circuitry includes a plurality of bitcells, each bitcell being readable as one of a '0' value and a '1' value, and sense amplifier circuitry configurable to read values from the plurality of bitcells, the sense amplifier circuitry including margin circuitry configurable (i) to selectably bias reading of the plurality of bitcells toward one of '0' values and '1' values, (ii) to identify addresses of bitcells having a stable '1' value when the margin circuitry is configured to bias reading of the plurality of bitcells toward '0' values, and (iii) to identify addresses of bitcells having a stable '0' value when the margin circuitry is configured to bias reading of the plurality of bitcells toward '1' values.

In a first implementation of a semiconductor device, each bitcell in the plurality of bitcells may include a differential transistor pair including a first transistor and a second transistor, each bitcell outputs a '1' value when a threshold voltage of the first transistor exceeds a threshold voltage of the second transistor, and each bitcell outputs a '0' value when the threshold voltage of the second transistor exceeds the threshold voltage of the first transistor.

A second implementation of such a semiconductor device may further include non-volatile memory configurable to store the addresses of the bitcells having the stable '1' value and the addresses of the bitcells having the stable '0' value.

According to a first aspect of that second implementation, the non-volatile memory is a one-time programmable memory.

A first instance of that first aspect of the second implementation may further include processing logic configured to read, without applying any bias, the values of the bitcells whose addresses have been stored, and to derive a stable unique bit string from the values of the bitcells whose addresses have been stored.

A first variant of that first instance of the first aspect of the second implementation may further include conditioning logic configured to process the stable unique bit string to derive a unique device secret key.

According to that variant, the conditioning logic may be configured to process the stable unique bit string by encryption.

In a third implementation of such a semiconductor device, each bitcell in the plurality of bitcells may include a differential transistor pair including a first transistor and a second transistor, the sense amplifier circuitry may include differential sense amplifier circuitry having a first current stage and a second voltage stage, the current stage may have a first leg coupled to a bit line of the first transistor and a second leg coupled to a bit line of the second transistor, the voltage stage may include a comparator coupled between the first leg and the second leg, and the margin circuitry may include a respective current generator coupled to a respective one of the first leg and the second leg, and configured to selectably inject a margining current into at most one of the first leg and the second leg at any one time.

A method according to implementations of the subject matter of this disclosure, for deriving a physical unclonable function from a semiconductor device that has a plurality of bitcells, each bitcell being readable as one of a '0' value and a '1' value, includes selectably biasing reading of the plurality of bitcells toward '0' values, to identify addresses of bitcells having a stable '1' value, and selectably biasing reading of the plurality of bitcells toward '1' values, to identify addresses of bitcells having a stable '0' value.

A first implementation of such a method may further include storing the addresses of the bitcells having the stable '1' value and the addresses of the bitcells having the stable '0' value.

A first aspect of that first implementation may further include reading, without applying any bias, the values of the bitcells whose addresses have been stored, and deriving a stable unique bit string from the values of the bitcells whose addresses have been stored.

A first instance of that first aspect of the first implementation may further include processing the stable unique bit string to derive a unique device secret key.

In a first variant of that first instance of the first aspect of the first implementation, processing the stable unique bit string may include applying a function to the stable unique bit string.

According to that first variant, applying a function to the stable unique bit string may include encrypting the stable unique bit string.

In a second implementation, selectably biasing reading of the plurality of bitcells toward '0' values may include injecting a margining current into a first leg of a differential sense amplifier coupled to at least one bitcell of the plurality of bitcells and selectably biasing reading of the plurality of bitcells toward '1' values comprises injecting a margining current into a second leg of a differential sense amplifier coupled to the at least one bitcell of the plurality of bitcells.

A method according to implementations of the subject matter of this disclosure, for deriving a unique device secret key from a semiconductor device that has a plurality of bitcells, each bitcell being readable as one of a '0' value and a '1' value, includes selectably biasing reading of the plurality of bitcells toward '0' values, to identify addresses of bitcells having a stable '1' value, selectably biasing reading of the plurality of bitcells toward '1' values, to identify addresses of bitcells having a stable '0' value, storing the addresses of the bitcells having the stable '0' value and the addresses of the bitcells having a stable '1' value, and reading, without bias, the values of the bitcells whose addresses have been stored to derive a unique device string.

A first implementation of such a method may further include processing the unique device string to derive the unique device secret key.

In a first aspect of that first implementation, processing the unique device string may include applying a function to the unique device string.

In a first variant of that first aspect, applying a function to the unique device string may include encrypting the unique device string.

In a second implementation of such a method, selectably biasing reading of the plurality of bitcells toward '0' values may include injecting a margining current into a first leg of a differential sense amplifier coupled to at least one bitcell of the plurality of bitcells, and selectably biasing reading of the plurality of bitcells toward '1' values may include injecting a margining current into a second leg of a differential sense amplifier coupled to the at least one bitcell of the plurality of bitcells.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

In accordance with implementations of the subject matter of this disclosure, a unique device secret may be generated from a physical unclonable function based on an entropy source that relies on natural variations in threshold voltages of otherwise identical functional units (e.g., MOSFET transistors) on the device resulting from random dopant fluctuations to create values that are intrinsic, unique and effectively random. A differential pair of such functional units on the device can provide a single bit of the physical unclonable function. For example, an array of differential MOSFET pairs can provide a plurality of bits.

Depending on the relative strength of each transistor in the differential pair, the differential pair will output a '1' if the True member of the differential pair is "stronger" (e.g., has a lower threshold voltage) than the Complement member of the differential pair, but will output a '0' if the Complement member of the differential pair is stronger than the True member of the differential pair. However, environmental conditions, including voltage and temperature, can affect the circuitry used to measure the outputs of the two members of the differential pair, and thereby impact the results of reading the cells. In addition, aging can cause shifts in the device threshold voltage and mobility and impact their mismatch. As a result, a particular differential pair may output a '1' at some times, and a '0' at other times. Therefore, a device secret based on all differential pairs on the device may violate the requirement that the device secret never change on any one device, even though it may satisfy the requirements of uniqueness and randomness.

Therefore, in accordance with implementations of the subject matter of this disclosure, circuitry is provided to extract the values of only the stable ones of the various differential pairs on the device. The circuitry may be a sense amplifier (sense amplifier circuitry) with an adjustable margin or bias. To extract the device secret, the margin or bias of the sense amplifier may be adjusted in the '0' direction during a first measurement to record which differential pairs output a '1' (so that some differential pairs that without margining or bias would output a '0' instead output a '1'), and then may be adjusted in the '1' direction during a second measurement to record which differential pairs output a '0' (so that some differential pairs that without margining or bias would output a '1' instead output a '0'). Only the outputs of those differential pairs that do not change between the first measurement and the second measurement are recorded for inclusion in the device secret. The address locations of those differential pairs may be stored in a "helper" data array and consulted each time the device secret is to be accessed, to locate the bits of the device secret.

The amount of margin or bias in the two different directions may be the same or may be different, but would typically be set to the same to achieve a balanced weighting of stable 0's and 1's. The distribution of strengths of the various differential pairs could be expected to be a normal distribution, in which case, the margin or bias in each direction would be set to ensure that bits selected as stable provide enough differential signal for robust readout across voltage, temperature and age (for example, one standard deviation of margin offset may be required). Any differential pair whose differential strength falls in the overlap region between the two margin or bias values may be deemed too unstable to consider for inclusion in the device secret.

As explained in more detail below, a two stage differential sense amplifier—e.g., where the first stage performs differential current sensing and the second stage performs differential voltage sensing—may be used to extract the stable bits.

As set forth above, once the stable bit locations have been identified, the stable bit locations are stored—e.g., in a "helper data array." When it is time to read the device secret—either to extract the device secret to provide to other devices for later authentication, or when authentication is attempted by another device—the locations previously identified as stable are read without bias or margining, and the values ('0' or '1') at those locations are used to generate the device secret key.

Although the values read out from the stable locations could be used directly to create the output key, such a key may not offer full entropy (i.e., randomness/uniqueness), or may not be of the correct key size (e.g., according to provisions of relevant standards). To ensure a full-entropy output key of the correct size, data condition (i.e., further processing of the read out values) may be required—e.g., through a specific cryptographic function. For example, while the number of stable bit locations may vary from device to device, a relevant standard (e.g., promulgated by NIST) may call for a particular number of bits in the key, or a minimum amount of entropy in the key, which may necessitate processing the stable bits from the entropy source through a function such as AES-256 encryption (for a 256-bit key).

The subject matter of this disclosure may be better understood by reference to FIGS. 1-8.

Figure 1:
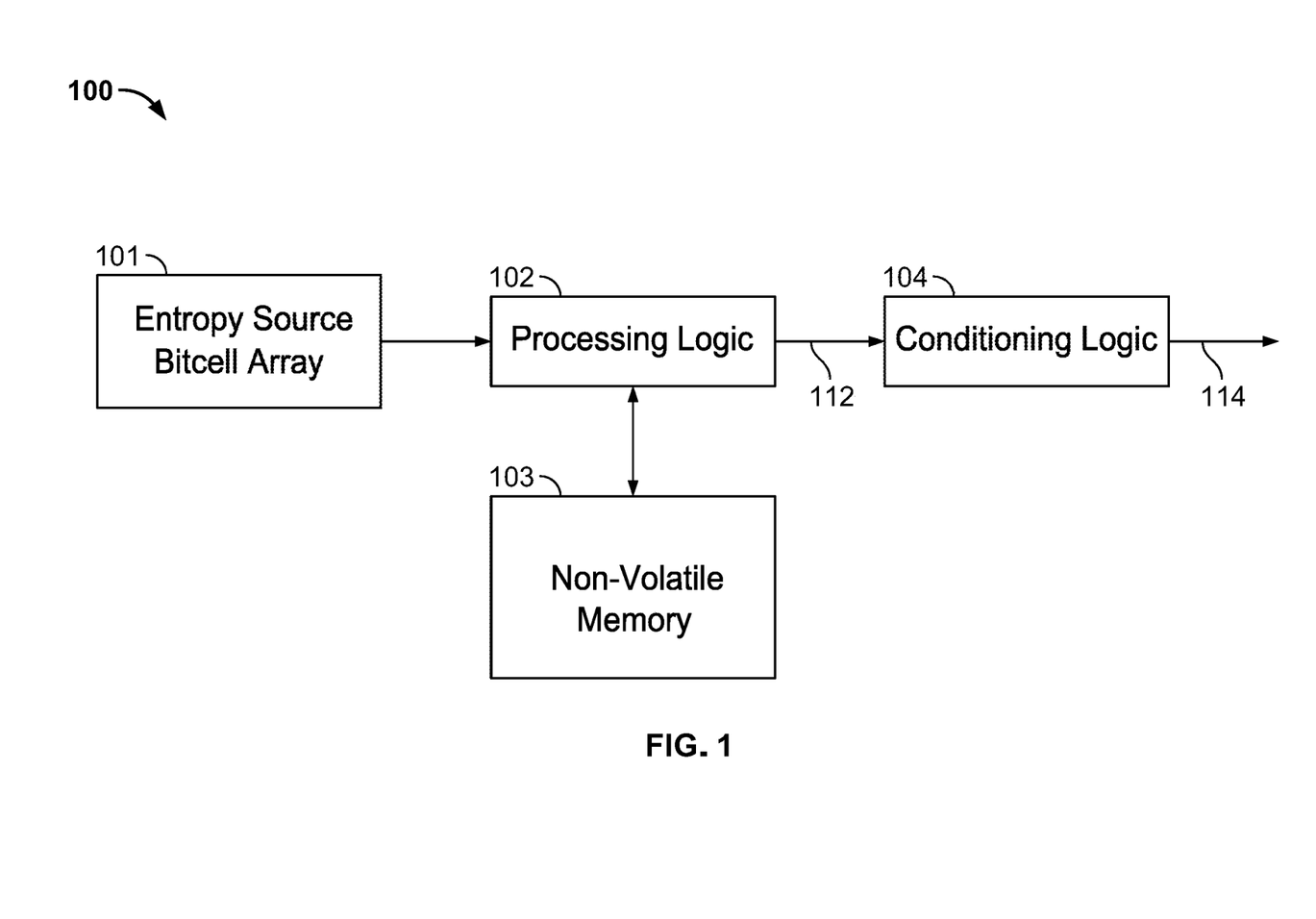
FIG. 1 is a block diagram of an overall architecture in accordance with implementations of the subject matter of this disclosure for generating unique device secret key.

FIG. 1 is a block diagram of an overall architecture 100 in accordance with implementations of the subject matter of this disclosure for generating unique device secret key.

Architecture 100 includes array 101 of differential semiconductor device pairs. Processing logic 102, which may incorporate the sense amplifier described above, and in more detail below, and may also incorporate error correction logic and control logic, extracts the stable differential bits 112 from the differential pairs in array 101, with the assistance of non-volatile memory 103, which may store the helper data described above. Non-volatile memory 103 may be any type of one-time programmable memory, such as eFUSE or antifuse memory, or may be a rewritable type of memory, such as Flash memory, and need not be secure because the helper data could be public. Conditioning logic 104, which may be a NIST-approved encryption technique such as AES-256 or other technique, operates on the stable differential bits 112 to yield the unique device secret key 114.

Figure 2:
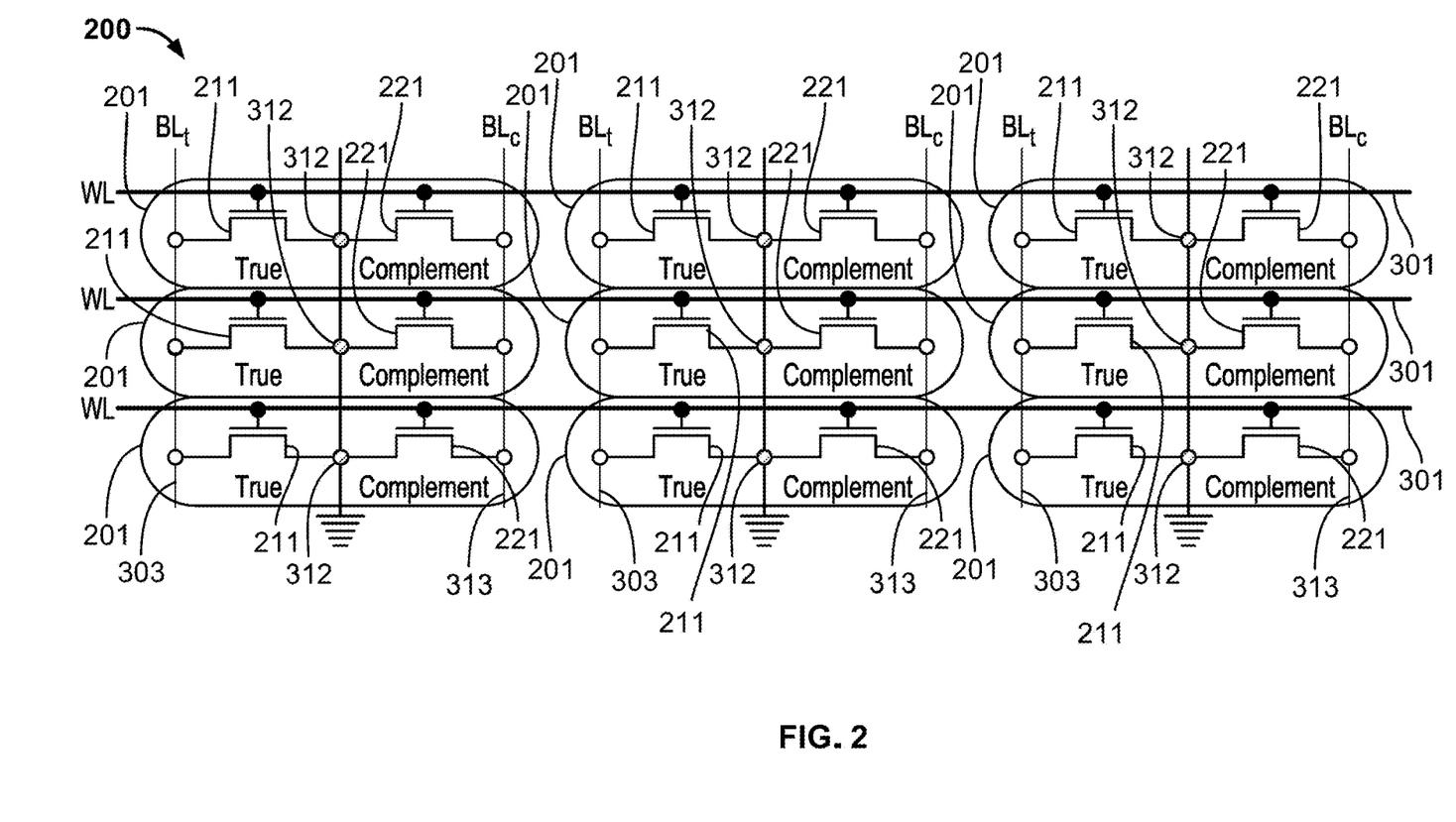
FIG. 2 is a schematic representation of a portion of a bitcell array in accordance with implementations of the subject matter of this disclosure.

Array 101 may have the structure 200 shown partially in FIG. 2. Each cell 201 of array 101 includes a pair of transistors 211, 221. In this implementation, transistors 211, 221 are n-type metal-oxide semiconductor field-effect transistors (NMOSFETS). However, the transistors of array 101 also could be p-type metal-oxide semiconductor field-effect transistors (PMOSFETS), in which case all n-type devices shown in the drawings would be replaced with p-type devices, and all p-type transistors shown in the drawings would be replaced with n-type devices.

Figure 3:
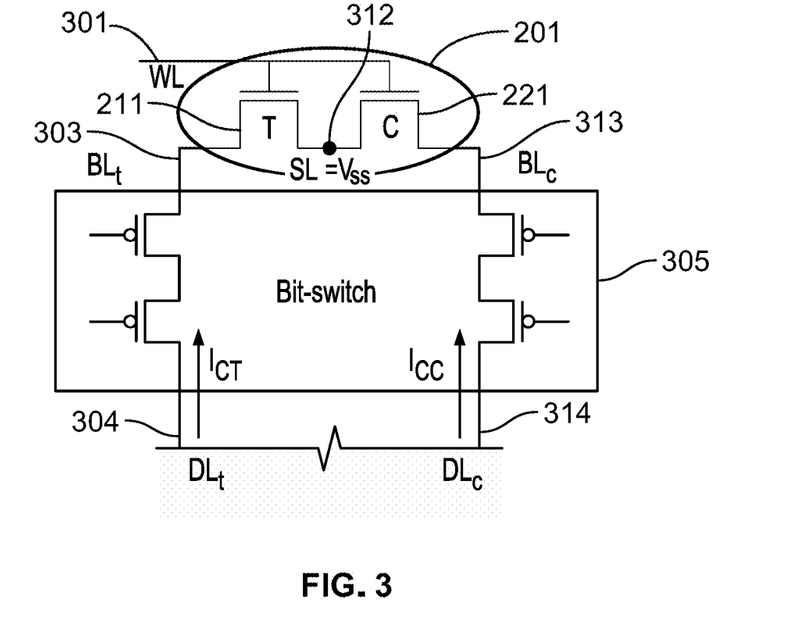
FIG. 3 shows the connections of one bitcell to the array of FIG. 2.

In the implementation shown, transistor 211 is the "True" transistor (designated by "True" or "T"), and transistor 221 is the "Complement" transistor (designated by "Complement" or "C"). FIG. 3 shows how each transistor 211, 221 is connected to one of the word lines 301 (designated by "WL"; also referred to as "row lines"). The source-drain junction 312 of transistors 211, 221 is grounded at 302. True transistor 211 is coupled to True bit line 303 (designated by "$BL_t$"), while Complement transistor 221 is coupled to Complement bit line 313 (designated by "$BL_c$"). Each respective word line 301 is also connected (not shown in FIG. 3) to other True/Complement transistor pairs 211, 221 in the same respective row. Each True and Complement bit line 303, 313 (also referred to as "column lines") in a respective pair of bit lines 303, 313 is connected (not shown in FIG. 3) to a respective True or Complement transistor 211, 221 in respective other rows of array 101. Each respective True/Complement bit line pair 303, 313 may be coupled to a respective True/Complement data line pair 304, 314 through bit switch 305 to allow multiple pairs of bit lines to share a common sense amplifier to conserve device area, but alternatively an individual sense amplifier could be provided for each bit line pair.

Although all word lines 301 in FIGS. 2 and 3 are labelled "WL," each word line 301 is separate (i.e., electrically isolated) from each other word line 301. The same holds for each True bit line $BL_t$ 303 and each Complement bit line $BL_c$ 313.

Figure 4:
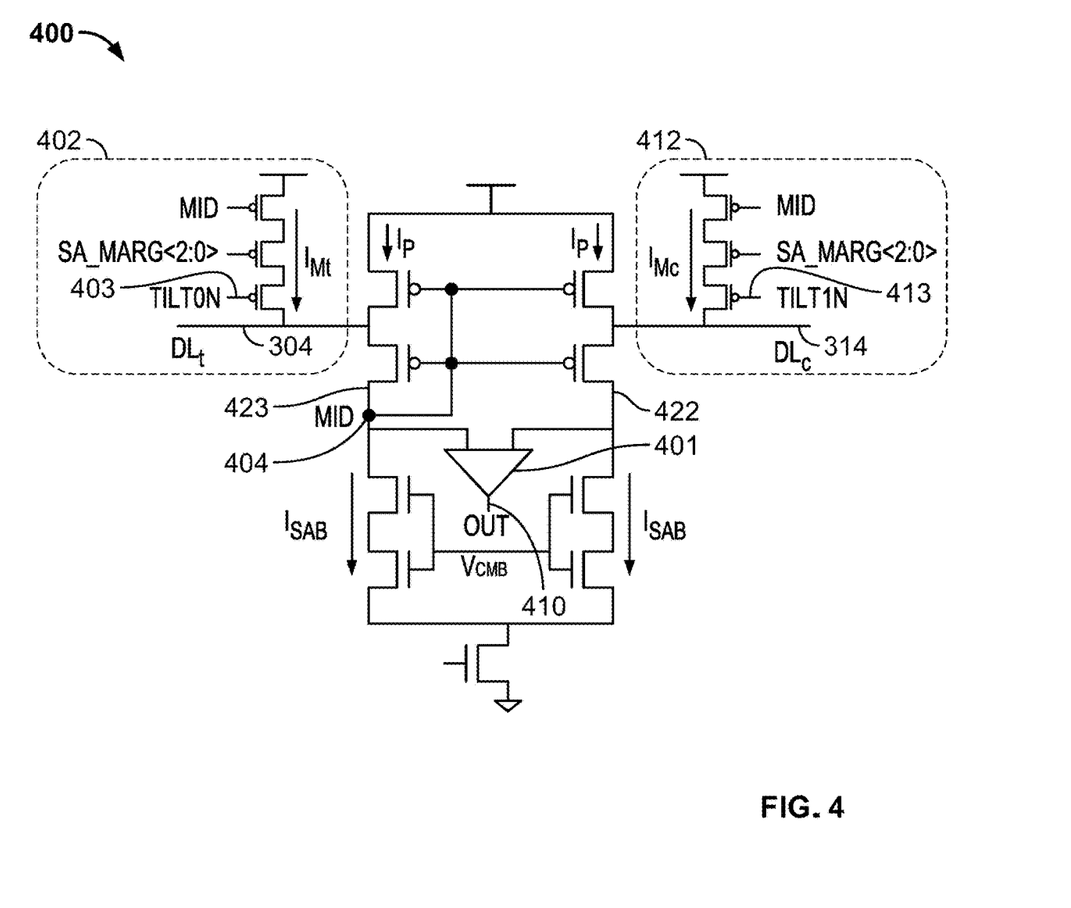
FIG. 4 is a schematic representation of a differential sense amplifier in accordance with implementations of the subject matter of this disclosure.

The value of the True/Complement differential transistor pair 211, 221 is read on True/Complement data line pair 304, 314 by a differential sense amplifier, such as sense amplifier 400 (FIG. 4).

In the implementation shown in FIG. 4, differential sense amplifier 400 is a two-stage differential sense amplifier, with a first differential sense amplifier stage that senses current on True/Complement data lines 304, 314, and a second differential sense amplifier stage that determines which of the currents on True/Complement data lines 304, 314 has induced a higher voltage. In the implementation shown, comparator 401, which may be a differential amplifier, such as a 5-transistor differential amplifier, constitutes the second differential sense amplifier stage with output OUT (410), while the remainder of differential sense amplifier 400 constitutes the first differential sense amplifier stage. In this implementation, the first stage operates on currents while the second stage operates on voltages. Respective True and Complement margin current generators 402, 412 (margin circuitry) on data lines 304, 314 provide the margining or bias referred to above, as follows.

Figure 5:
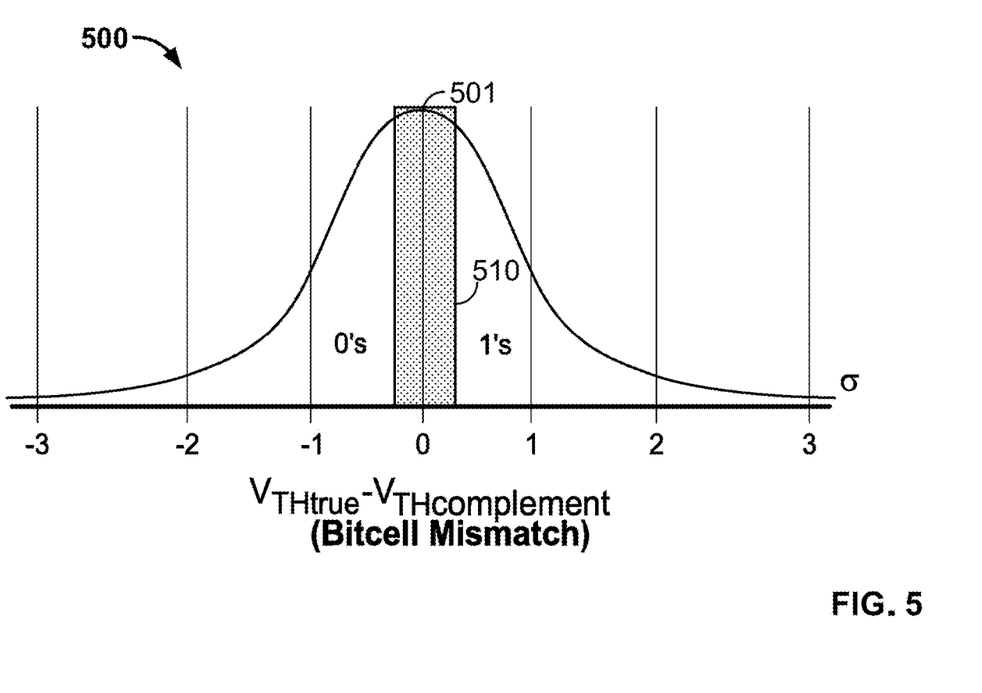
FIG. 5 shows a distribution of values of bitcells in the array of FIG. 2.

The output bit of each differential transistor pair 211, 221 is determined by the difference in threshold voltages, also referred to as the bitcell mismatch, between True transistor 211 and Complement transistor 221. For any particular pair, if $V_{THtrue} > V_{THcomplement}$, then output 410 is a '1'; if $V_{THtrue} < V_{THcomplement}$, then output 410 is a '0'; if $V_{THtrue} = V_{THcomplement}$, then output 410 is indeterminate. The expected distribution of bitcell mismatches caused by natural random dopant variations is a normal distribution 500 as shown in FIG. 5, where the abscissa represents the mismatch value, centered on zero and measured in numbers of standard deviations ($\sigma$) from zero. The ordinate represents the number of cells having each mismatch value.

The greatest number of cells, at the peak 501 of normal distribution 500, have zero mismatch and therefore provide indeterminate output values. All cells to the right of peak 501, having a larger $V_{THtrue}$ than $V_{THcomplement}$, represent outputs of '1'. All cells to the left of peak 501, having a smaller $V_{THtrue}$ than $V_{THcomplement}$, represent outputs of '0'.

Figure 6:
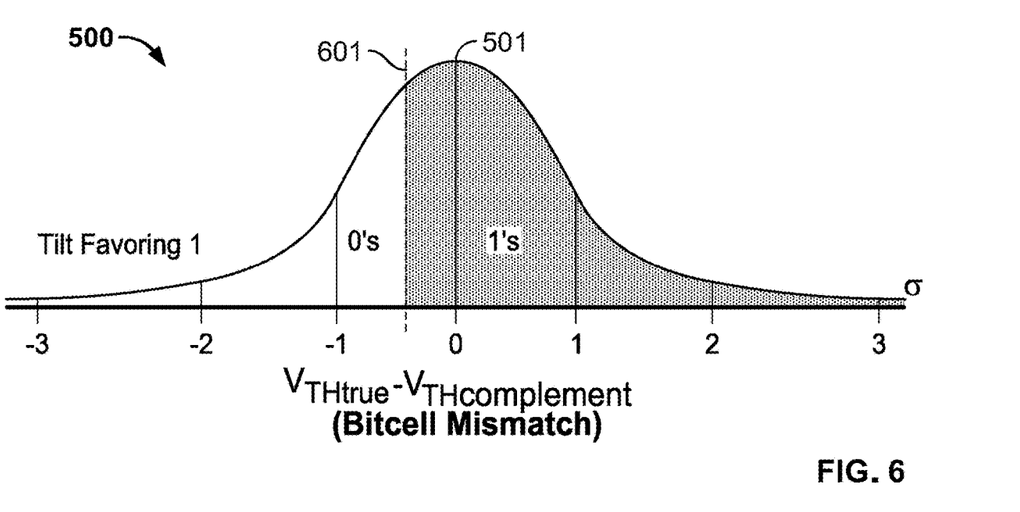
FIG. 6 shows the result on the distribution of FIG. 5 of biasing the reading of bitcell values in favor of '1'.
Figure 7:
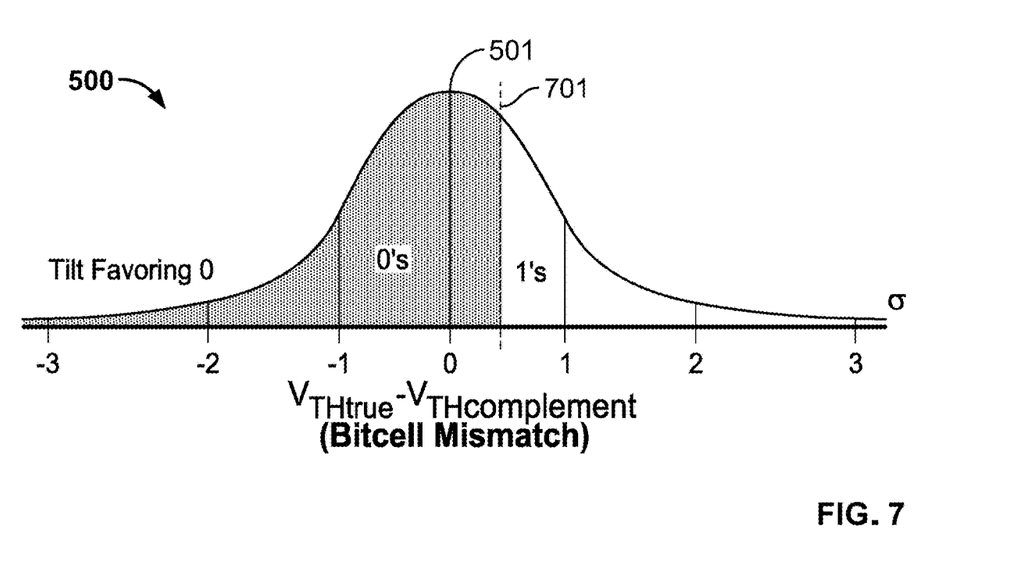
FIG. 7 shows the result on the distribution of FIG. 5 of biasing the reading of bitcell values in favor of '0'.

However, as noted above, output values near peak 501, in zone 510, corresponding to cells which are nearly evenly matched, are unstable, because the degree of mismatch in those cells may not be sufficient for accurate sensing across environmental conditions such as voltage or temperature, or over time as a result of circuit aging effects. Therefore, in order to establish the physical unclonable function, the output bits are read twice—first with a bias toward '1', i.e., shifting the cutoff 601 to the left of peak 501 as shown in FIG. 6 so that output bits that would otherwise be '0' become '1', and second with a bias toward '0', i.e., shifting the cutoff 701 to the right of peak 501 as shown in FIG. 7 so that output bits that would otherwise be '1' become '0'. The only '0' values whose array locations are stored as helper data are those '0' values to the left of biased cutoff 601, while the only '1' values whose array locations are stored as helper data are those '1' values to the right of biased cutoff 701. The magnitudes of the shift from peak 501 to cutoff 601 and the shift from peak 501 to cutoff 701 may or may not be the same. The magnitude of the shifts may be determined based on modeled signal requirements of the sensing circuitry. The shift is selected to remove cells with less signal than the modeled requirements.

Returning to FIG. 4, in order to establish cutoff 601 to the left of peak 501, favoring a '1' output (i.e., to force unstable 0's to become 1's), Complement margin current generator 412 is activated by asserting signal TILT1N 413, to inject a margin current into leg 422 of differential sense amplifier 400. In order to establish cutoff 701 to the right of peak 501, favoring a '0' output (i.e., to force unstable 1's to become 0's), True margin current generator 402 is activated by asserting signal TILT0N 403, to inject a margin current into leg 423 of differential sense amplifier 400. Only one of signals TILT0N 403 and TILT1N 413 is asserted at any one time (as inverted signals, signals TILT0N 403 and TILT1N 413 are asserted LOW).

The voltage at the point labelled "MID" (404), which is determined by True transistor threshold voltage $V_{THtrue}$, based on current mirror bias voltage $V_{CMB}$, determines the True and Complement margin currents ($I_{Mt}$, $I_{Mc}$) by setting a bias of respective transistor 414. The total margin current ($I_{Mt}$ or $I_{Mc}$) is determined by a three-bit value SA_MARG, which controls weighted current sources that provide current source legs set at 1×, 2× and 4×, enabling total margin currents from 1× to 7× in 1× increments.

Once the stable outputs are identified and stored in helper data memory 103, then only the stable outputs are read, without applying any margin or bias. The result is the value 112 which is input to the conditioning logic 104 to yield the unique device secret key 114. Because unique device secret key 114 is generated each time it is needed, and the same key is always generated, there is no need to ever store unique device secret key 114, eliminating the possibility of unique device secret key 114 being stolen by an unauthorized access. Typically unique device secret key 114 is read out at boot time and never loaded again unless power is cycled. Unique device secret key 114 is used by device security logic and key management for the security functions.

Figure 8:
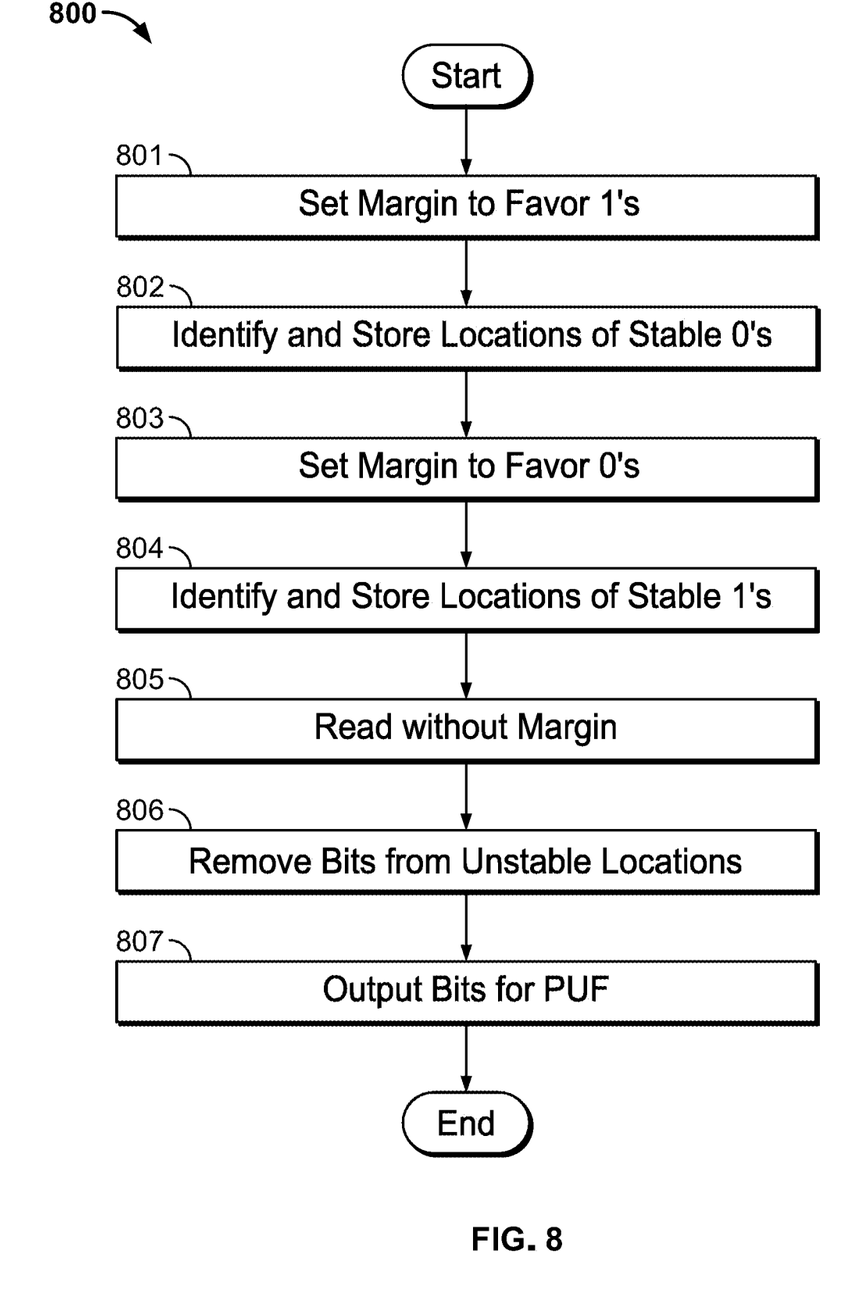
FIG. 8 is a flow diagram illustrating a technique in accordance with implementations of the subject matter of this disclosure for identifying and then reading stable bits.

An implementation of a technique 800 for identifying and then reading the stable bits is diagrammed in FIG. 8 and begins at 801, where the margin or bias is set, as described above in connection with FIG. 6, to favor bits being read as '1'. Next, at 802, bits are read and each bit that reads as '0' is identified as being a stable '0'. The location of each stable '0' is recorded in helper data array 103. At 803, the margin or bias is set, as described above in connection with FIG. 7, to favor bits being read as '0'. Next, at 804, bits are read and each bit that reads as '1' is identified as being a stable '1'. The location of each stable '1' is recorded in helper data array 103. In some implementations, the identification of each stable '1' at 803 and 804 may occur before, rather than after, the identification of each stable '0' at 801 and 802.

After each stable '0' and each stable '1' have been identified and their locations stored at 801-804, at 805 reading is performed without margin or bias. This may occur a first time, to establish the device secret key, or later, during run-time, when the device secret key is needed (e.g., to derive a further key to verify access to or by a remote device). All bits are read at 805, and at 806 those bits from locations, as indicated in the helper data, were not previously identified as stable locations, are removed or discarded. At 807, the remaining bits are output for use in generating the physical unclonable function and processing into the unique device secret key, and method 800 ends.

Once the unique device secret key has been derived for a local device, as by method 800, it may be shared with other trusted devices so that other devices may access the local device. However, the unique device secret key need not be stored in the local device. Instead when another trusted device seeks access, the other trusted device will provide the unique device secret key that was previously provided to it and the local device will regenerate the unique device secret key. If the key provided by the other trusted device matches the key regenerated by the local device, the local device will grant the remote device access to the local device; otherwise access will be denied.

Thus it is seen that an arrangement of semiconductor devices that can serve as an entropy source for a physical unclonable function, and circuitry for extracting that physical unclonable function from the entropy source, as well as methods of operation to derive the physical unclonable function, and to use the physical unclonable function to derive a unique device secret key, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A semiconductor device including circuitry configured to derive a physical unclonable function, the circuitry comprising:
  a plurality of bitcells, wherein: each bitcell in the plurality of bitcells comprises a differential transistor pair including a plurality, fewer than three, of transistors, each bitcell outputs a '1' value when a threshold voltage of a first transistor in the plurality of transistors exceeds a threshold voltage of a second transistor in the plurality of transistors, and each bitcell outputs a '0' value when the threshold voltage of the second transistor exceeds the threshold voltage of the first transistor; and
  sense amplifier circuitry configurable to read values from the plurality of bitcells, the sense amplifier circuitry comprising:
    differential sense amplifier circuitry having a current stage and a voltage stage, the current stage having a first leg coupled to a bit line of the first transistor and a second leg coupled to a bit line of the second transistor, the voltage stage comprising a comparator coupled between the first leg and the second leg, and
    margin circuitry configurable (i) to selectably bias reading of the plurality of bitcells toward one of '0' values and '1' values by a current generator coupled to a respective one of the first leg and the second leg, and configured to selectably inject at any one time a margining current into at most one of the first leg and the second leg, (ii) to identify addresses of bitcells having a stable '1' value when the margin circuitry is configured to bias reading of the plurality of bitcells toward '0' values, and (iii) to identify addresses of bitcells having a stable '0' value when the margin circuitry is configured to bias reading of the plurality of bitcells toward '1' values.

2. The semiconductor device of claim 1, further comprising non-volatile memory configurable to store the addresses of the bitcells having the stable '1' value and the addresses of the bitcells having the stable '0' value.

3. The semiconductor device of claim 2, wherein the non-volatile memory is a one-time programmable memory.

4. The semiconductor device of claim 3, further comprising processing logic configured to read, without applying any bias, the values of the bitcells whose addresses have been stored, and to derive a stable unique bit string from the values of the bitcells whose addresses have been stored.

5. The semiconductor device of claim 4, further comprising conditioning logic configured to process the stable unique bit string to derive a unique device secret key.

6. The semiconductor device of claim 5, wherein the conditioning logic is configured to process the stable unique bit string by encryption.

7. A method for deriving a physical unclonable function from a semiconductor device that has a plurality of bitcells, each bitcell being readable as one of a '0' value and a '1' value and comprising a differential transistor pair including a plurality, fewer than three, of transistors, the method comprising:
    selectably biasing reading of the plurality of bitcells toward '0' values by injecting a margining current into a first leg of a differential sense amplifier coupled to at least one bitcell of the plurality of bitcells, to identify addresses of bitcells having a stable '1' value; and
    at a time different from when selectably biasing reading of the plurality of bitcells toward '0' values, selectably biasing reading of the plurality of bitcells toward '1' values by injecting a margining current into a second leg of a differential sense amplifier coupled to the at least one bitcell of the plurality of bitcells, to identify addresses of bitcells having a stable '0' value.

8. The method of claim 7, further comprising storing the addresses of the bitcells having the stable '1' value and the addresses of the bitcells having the stable '0' value.

9. The method of claim 8, further comprising:
    reading, without applying any bias, the values of the bitcells whose addresses have been stored; and
    deriving a stable unique bit string from the values of the bitcells whose addresses have been stored.

10. The method of claim 9, further comprising processing the stable unique bit string to derive a unique device secret key.

11. The method of claim 10, wherein processing the stable unique bit string comprises applying a function to the stable unique bit string.

12. The method of claim 11, wherein applying a function to the stable unique bit string comprises encrypting the stable unique bit string.

13. A method of deriving a unique device secret key from a semiconductor device that has a plurality of bitcells, each bitcell being readable as one of a '0' value and a '1' value and comprising a differential transistor pair including a plurality, fewer than three, of transistors, the method comprising:
    selectably biasing reading of the plurality of bitcells toward '0' values by injecting a margining current into a first leg of a differential sense amplifier coupled to at least one bitcell of the plurality of bitcells, to identify addresses of bitcells having a stable '1' value;
    at a time different from when selectably biasing reading of the plurality of bitcells toward '0' values, selectably biasing reading of the plurality of bitcells toward '1' values by injecting a margining current into a second leg of the differential sense amplifier coupled to the at least one bitcell of the plurality of bitcells, to identify addresses of bitcells having a stable '0' value; and
    storing the addresses of the bitcells having the stable '0' value and the addresses of the bitcells having a stable '1' value.

14. The method of claim 13, further comprising processing the unique device string to derive the unique device secret key.

15. The method of claim 14, wherein processing the unique device string comprises applying a function to the unique device string.

16. The method of claim 15, wherein applying a function to the unique device string comprises encrypting the unique device string.

* * * * *